United States Patent
Kobayashi et al.

(10) Patent No.: US 6,415,240 B1
(45) Date of Patent: Jul. 2, 2002

(54) COORDINATES INPUT APPARATUS AND SENSOR ATTACHING STRUCTURE AND METHOD

(75) Inventors: Katsuyuki Kobayashi, Yokohama; Atsushi Tanaka, Yamato; Yuichiro Yoshimura, Kamakura; Ryozo Yanagisawa, Inzai; Hajime Sato, Yokohama, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/136,067

(22) Filed: Aug. 19, 1998

(30) Foreign Application Priority Data

Aug. 22, 1997 (JP) .............................................. 9-226827

(51) Int. Cl.⁷ .......................... G08C 21/00; G09G 3/02
(52) U.S. Cl. ........................ 702/150; 702/95; 702/56; 178/18.04; 178/19.02; 345/176; 345/177
(58) Field of Search ........................... 702/56, 95, 150; 178/18.03, 18.04, 19.02; 345/173, 176, 177, 179; 367/907

(56) References Cited

U.S. PATENT DOCUMENTS

| | | | |
|---|---|---|---|
| 4,613,964 A | 9/1986 | Ichikawa et al. | 369/45 |
| 4,886,943 A | 12/1989 | Suzuki et al. | 178/18 |
| 4,887,245 A | 12/1989 | Mori et al. | 367/129 |
| 4,897,510 A | 1/1990 | Tanaka et al. | 178/18 |
| 4,910,363 A | 3/1990 | Kopbayashi et al. | 178/18 |
| 4,931,965 A | 6/1990 | Kaneko et al. | 364/560 |
| 4,980,518 A | 12/1990 | Kobayashi et al. | 178/18 |
| 5,017,913 A | 5/1991 | Kaneko et al. | 340/712 |
| 5,070,325 A | 12/1991 | Tanaka et al. | 340/706 |
| 5,097,102 A | 3/1992 | Yoshimura et al. | 178/18 |
| 5,142,106 A | 8/1992 | Yoshimura et al. | 178/18 |
| 5,210,785 A | 5/1993 | Sato et al. | 379/58 |
| 5,231,394 A | 7/1993 | Sato | 341/50 |
| 5,239,138 A | 8/1993 | Kobayashi et al. | 178/18 |
| 5,500,492 A | 3/1996 | Kobayashi et al. | 178/18 |
| 5,517,553 A | 5/1996 | Sato | 379/59 |
| 5,539,678 A | 7/1996 | Tanaka et al. | 364/561 |
| 5,565,893 A | 10/1996 | Sato et al. | 345/177 |
| 5,621,300 A | 4/1997 | Sato et al. | 320/5 |
| 5,714,698 A | 2/1998 | Tokioka et al. | 783/865.4 |
| 5,736,979 A | 4/1998 | Kobayashi et al. | 345/177 |
| 5,751,133 A | 5/1998 | Sato et al. | 320/13 |
| 5,761,087 A * | 6/1998 | Yoshimura et al. | 702/56 |
| 5,805,147 A | 9/1998 | Tokioka et al. | 345/173 |
| 5,818,429 A | 10/1998 | Tanaka et al. | 345/173 |
| 5,831,603 A | 11/1998 | Yoshimura et al. | 345/177 |
| 5,862,049 A * | 1/1999 | Sato et al. | 700/85 |
| 5,933,149 A | 8/1999 | Mori et al. | 345/442 |
| 5,936,207 A | 8/1999 | Kobayashi et al. | 178/18.01 |
| 6,041,284 A * | 3/2000 | Yoshimura et al. | 702/56 |

FOREIGN PATENT DOCUMENTS

| | | | | |
|---|---|---|---|---|
| JP | 61-33525 | 2/1986 | | G06F/3/03 |
| JP | 64-68823 | 3/1989 | | G06F/3/03 |
| JP | 1-114927 | 5/1989 | | G06F/3/03 |

* cited by examiner

*Primary Examiner*—Kamini Shah
(74) *Attorney, Agent, or Firm*—Fitzpatrick, Cella, Harper & Scinto (57) ABSTRACT

A mechanical degree of freedom is provided between electrodes and sensors, thereby accomplishing both of the assurance of an arranging position precision of the sensors and the easiness of manufacturing. In a coordinates input apparatus for detecting a coordinates position on the basis of a delay time which is required until an elastic wave oscillation which propagates on an oscillation propagating plate arrives at an oscillation sensor, an oscillation sensor is fixed in a manner such that one electrode surface is come into contact with a conductive surface of an oscillation propagating plate. A contact member is positioned onto the other electrode surface of the oscillation sensor by an annular member by using an external shape of the sensor as a reference. An electrode unit includes a signal electrode and a ground electrode. The ground electrode is come into contact with the conductive surface so as to be electrically conductive thereto. The signal electrode is come into contact with the contact member so as to be electrically conductive to the electrode surface of the sensor through the contact member.

16 Claims, 9 Drawing Sheets

COORDINATES INPUT APPARATUS AND SENSOR ATTACHING STRUCTURE AND METHOD

BACKGROUND OF THE INVENTION

1. Field of the Invention

The invention relates to a coordinates input apparatus and sensor attaching structure and method. More particularly, the invention relates to a coordinates input apparatus for detecting an elastic wave oscillation inputted to an oscillation propagating plate by a plurality of sensors attached to the oscillation propagating plate and for detecting coordinates of an oscillation input point on the basis of a propagation time of the elastic wave oscillation and also relates to its sensor attaching structure and method.

2. Related Background Art

Generally, as an oscillation detecting device (hereinafter, also referred to as an oscillation sensor) to detect an oscillation which propagates in an object, piezoelectric ceramics such as lead zirconate titanate (hereinafter, abbreviated to "PZT") or the like is used. A shape, an oscillating mode, and the like of such an oscillation detecting device are set so as to efficiently detect an acoustic wave of a predetermined frequency of an oscillation which propagates in the object. That is, to efficiently detect the oscillation, a device shape is determined so as to make a mechanical resonance frequency of the sensor coincide with a frequency of the detected acoustic wave and a sensitivity of the device or an attaching method of the device is determined in consideration of an oscillating mode or the like of the oscillation to be detected.

A conventional example of a coordinates input apparatus for calculating position coordinates of an oscillation input point by measuring an arrival delay time of an acoustic wave from an oscillation generating source by using such a kind of oscillation sensor has been shown in JP-A-61-33525 (Japanese Patent Application No. 59-153118). JP-A-61-33525 discloses a method of adhering and fixing the oscillation sensor to a desired position of an oscillation propagating plate and obtaining an electric conduction by a lead wire from the oscillation sensor.

Further, for instance, in JP-A-01-68823 (Japanese Patent Application No. 62-225393) and JP-A-01-114927 (Japanese Patent Application No. 62-273962), there is disclosed an example in which a guide to position a sensor is provided, the sensor is fitted into an engaging hole formed in the guide, thereby positioning the sensor, and the positioned sensor is come into pressure contact and fixed to the oscillation propagating plate by a spring force or the like.

In such a kind of coordinates input apparatus, an arrival delay time of the wave from an oscillation generating source to each oscillation detecting device is first measured and a distance between an oscillation input point and each oscillation detecting device is calculated by the product of an acoustic velocity of the wave and each delay time, respectively. As a basic principle, the position coordinates of the oscillation input point are geometrically calculated from the distance information and the arrangement of the sensors. Therefore, to accurately calculate the coordinates, it is necessary to accurately obtain the position of the oscillation detecting device or to accurately fix the oscillation detecting device at a desired position.

The above conventional example, however, has the following problems.

According to JP-A-61-33525, to obtain an electric conduction with the oscillation detecting device, a lead wire is attached to an electrode of the oscillation detecting device by means such as solder or the like. Therefore, characteristics of the oscillation detecting devices vary in dependence on an amount of solder or a soldering position and it is difficult to obtain a stable signal from each oscillation detecting device. That is, although a plurality of oscillation detecting devices are necessary to calculate the coordinates, the characteristics of the device are deteriorated due to the foregoing electrode taking means and it is difficult to construct a plurality of detecting devices having the same characteristics.

Particularly, in case of using such a coordinates input apparatus to a pen input computer such that the coordinates input apparatus and an output apparatus such as a display or the like are overlappingly arranged and a process can be performed with a feeling as if the user executed it by using a paper and a pencil, even in consideration of portability or the like of the apparatus, a size of the oscillation detecting device itself is restricted and it is easily presumed that a small detecting device is ordinarily used. In such a case, therefore, even if a solder amount is small, an influence on the characteristics of the oscillation detecting device by the solder amount cannot be ignored. Therefore, some compensating means including an adjustment or the like is necessary and it becomes not only a cause of an increase in costs but also an obstacle to realize a mass production of the apparatus.

Further, generally, an electric energy which is generated by the foregoing oscillation detecting deice itself is very weak and noises have to be sufficiently considered until the signal is amplified by amplifying means. That is, the wirings are complicated and the productivity is remarkably low because of various factors such as a countermeasure for noises and the like in addition to a device shape of the oscillation detecting device and a restriction on the characteristics.

On the other hand, in JP-A-01-68823 and JP-A-01-114927, by arranging an electrical contact to a position on an axis of the oscillation detecting device by a spring force without using any means such as solder or the like, a working efficiency is improved. However, the mass productivity is not sufficiently improved due to the wiring of lead wires or the like, the construction of a shield, or the like. The above conventional technique also has the following new problems.

As shown in the construction shown in JP-A-6133525, in case of adhering the oscillation detecting device to the oscillation propagating plate as one member, the oscillation detecting device can be accurately adhered and fixed onto the oscillation propagating plate by using an XY stage using an excellent positioning precision such as a tool of high precision, for example, a linear scale or the like and an image processing technique. However, according to the constructions shown in JP-A-01-68823 and JP-A-01-114927, although the sensor is positioned by the engaging hole formed in the guide, it is not easy to correctly set the position of the guide.

A fact that the position of the guide cannot be correctly set results in that the position of the oscillation sensor cannot be correctly set, causing a trouble of deterioration of the coordinates detecting precision. That is, in such a kind of coordinates input apparatus, the distance between the oscillation input point and each oscillation sensor is derived by the arrival time of the wave and the acoustic velocity and the position of the oscillation input point is derived from geometrical arrangement information of the oscillation sensors.

Therefore, if an error is included in the arrangement of the oscillation sensors, a coordinates calculating precision deteriorates merely due to such an error.

Explanation will now be made by using specific numerals. There is a case where the relative distance of the oscillation detecting device is equal to, for example, about 500 mm in dependence on a use object. It is technically very difficult to mass-produce the apparatus at a mechanical working precision by setting a tolerance for the distance 500 mm to ±0.05 mm (tolerance is equal to 0.01%). Even if a working technique which enables such a construction exists, the costs are very high and become a large obstacle to realize the mass production of the apparatus. In the conventional technique as mentioned above, a positioning precision of the oscillation detecting device depends on the working precision when the apparatus is mass-produced. For example, now assuming that the tolerance of 0.1% (namely, working precision of ±0.5 mm) exists for the distance 500 mm, a coordinates calculating precision of the coordinates input apparatus which is obtained is not better than ±0.5 mm due to such a tolerance. That is, it is difficult to cheaply mass-produce the coordinates input apparatus which can calculate the coordinates at a high precision.

As a method of solving the above problem, a method whereby after the apparatus was assembled, the position of the oscillation detecting device is measured and accurate geometrical information is obtained with respect to the sensor arrangement, thereby improving the coordinates calculating precision is considered. According to such a method, however, since the devices are arranged at random within a range of the working precision, a calculation to get the coordinates from the information becomes complicated, a calculation amount remarkably increases, and a calculation time becomes long. Therefore, a problem of a decrease in sampling speed for calculation of the coordinates occurs. For example, in case of an apparatus which can sample the coordinates at a rate of 200 times/sec, by assembling such correcting means, the calculation time to calculate the coordinates increases and if the sampling speed decreases to, for example, 50 times/sec, a problem such that a handwriting of the operator cannot be reproduced at a high fidelity occurs. Particularly, when a handwriting speed of the operator is high, such a phenomenon becomes remarkable. Therefore, it becomes a cause of erroneous recognition in a system such that a character recognition is performed by the coordinates information and such a problem becomes fatal. It will be obviously understood that an increase in costs due to an increase in number of inspecting steps cannot be avoided.

The invention is made in consideration of the above problems and it is an object of the invention to provide a coordinates input apparatus and sensor attaching structure and method, in which a mechanical degree of freedom is provided between an electrode which is electrically connected to a sensor and the sensor, thereby realizing both of the assurance of an arranging positional precision of the sensors and easiness of manufacturing.

Another object of the invention is to integratedly forming an electrode which is electrically connected to a sensor and a shield member, thereby enabling electric wires to the sensor to be easily performed.

SUMMARY OF THE INVENTION

According to a preferred embodiment of the invention, there is provided a coordinates input apparatus for calculating an oscillation inputted coordinates position on an oscillation propagating plate on the basis of a delay time which is required until an elastic wave oscillation inputted onto the oscillation propagating plate arrives at oscillation detecting means and for outputting the calculated coordinates position, comprising: a detecting device which is fixed in a manner such that one electrode surface is come into contact with a conductive surface of the oscillation propagating plate and detects the oscillation which is propagated in the oscillation propagating plate; a contact member which is arranged on the other electrode surface of a sensor; positioning means for positioning the contact member by using an external shape of the sensor as a reference; a first electrode member which is come into contact with the conductive surface so as to be electrically conductive; and a second electrode member which is come into contact with the contact member so as to be electrically conductive with the electrode surface of the sensor through the contact member.

DETAILED DESCRIPTION OF THE PREFERRED EMBODIMENT

An embodiment according to the invention will now be described hereinbelow in detail with reference to the drawings.

<Construction of a whole coordinates input apparatus>

Figure 1:
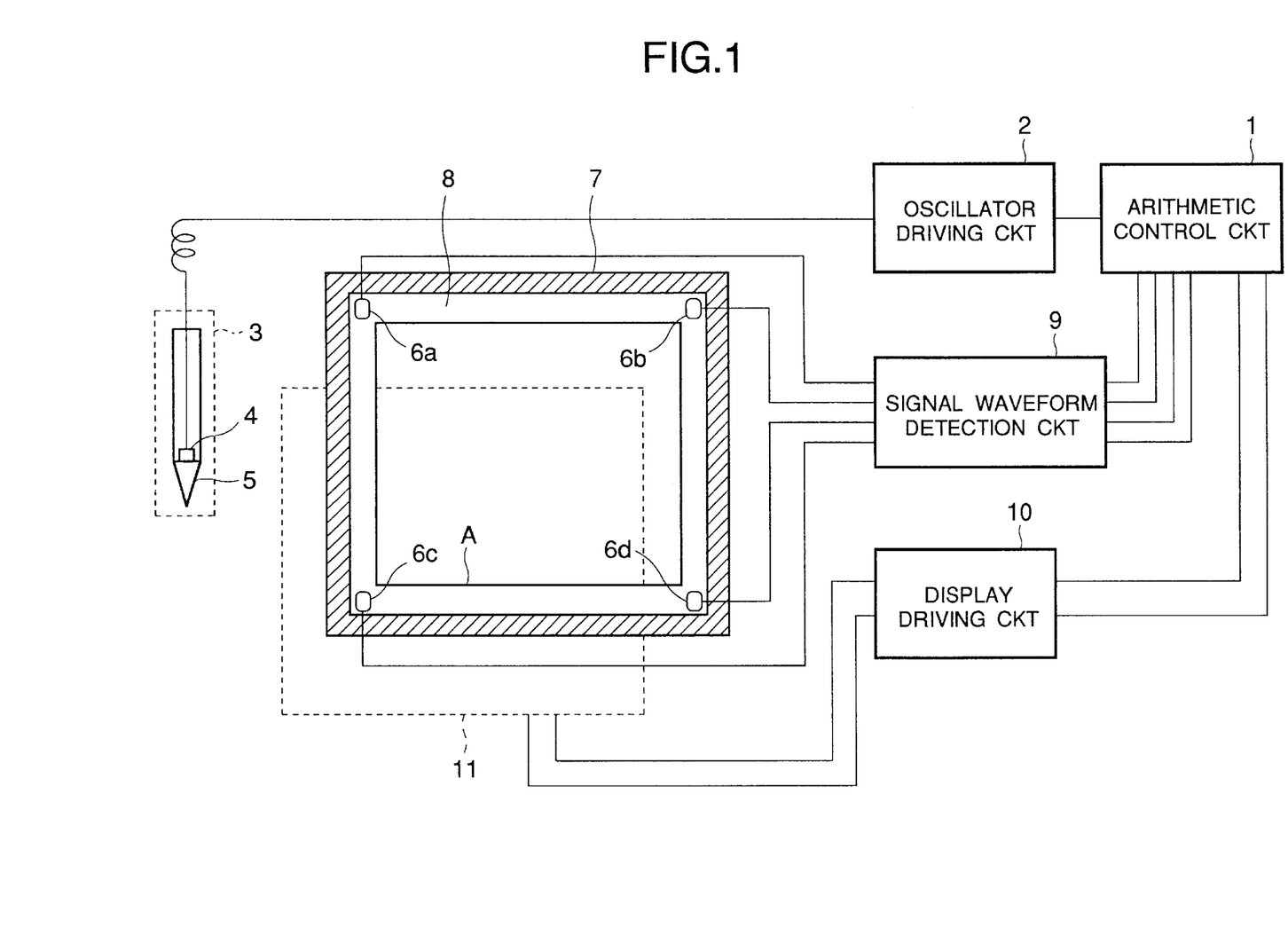
FIG. 1 is a block diagram showing a whole construction of a coordinates input apparatus according to an embodiment.

FIG. 1 is a block diagram showing a whole construction of the coordinates input apparatus according to the embodiment. First, the construction of the whole coordinates input apparatus according to the embodiment will be described with reference to FIG. 1.

In FIG. 1, reference numeral 1 denotes an arithmetic control circuit to control the whole apparatus and calculate a coordinates position. Reference numeral 2 denotes an oscillator driving circuit 2 to oscillate an oscillator 4 built in an oscillatory pen 3 and to input an oscillation generated through a pen tip 5 to an oscillation propagating plate 8. The oscillation propagating plate 8 is made of a transparent member such as acryl, glass plate, or the like. A coordinates input by the oscillatory pen 3 is performed by touching a coordinates input effective area (hereinafter, referred to as an effective area; area of a reference character A shown by a solid line in the diagram) on the oscillation propagating plate 8 by the oscillatory pen 3.

A damping member 7 for preventing (attenuating a reflection wave) that the oscillation inputted by the oscillatory pen 3 is reflected by an edge surface of the oscillation propagating plate 8 and is returned to a center portion is provided around an outer periphery of the oscillation propagating plate 8. Oscillation sensors 6a to 6d (hereinafter, generally referred to as an oscillation sensor 6) such as piezoelectric transducers or the like each for converting a mechanical oscillation to an electric signal are fixed to a peripheral portion of the oscillation propagating plate 8 as shown in the diagram.

After a signal from the oscillation sensor 6 was amplified by an amplifying circuit (not shown), it is sent to a signal waveform detection circuit 9 and is subjected to a predetermined signal process. A result of the signal process is outputted to the arithmetic control circuit 1, thereby calculating coordinates. The details of the signal waveform detection circuit 9 and arithmetic control circuit 1 will be separately explained hereinlater. Reference numeral 11 denotes a display such as a liquid crystal display or the like which can display on a dot unit basis. The display 11 is arranged behind the oscillation propagating plate. By the driving of a display driving circuit 10, the display 11 displays dots at the position traced by the oscillatory pen 3. A display content on the display 11 can be seen through the oscillation propagating plate 8 (for example, in case of the plate made of a transparent member such as glass or the like).

The oscillator 4 built in the oscillatory pen 3 is driven by the oscillator driving circuit 2. A drive signal of the oscillator 4 is supplied as a pulse signal of a low level from the arithmetic control circuit 1 and is amplified by a predetermined gain by the oscillator driving circuit 2. After that, the amplified signal is supplied to the oscillator 4. The electric drive signal is converted to a mechanical supersonic wave oscillation by the oscillator 4 and is transferred to the oscillation propagating plate 8 through the pen tip 5. As an oscillating frequency of the oscillator 4, a value such that a plate wave can be generated in the oscillation propagating plate 8 such as a glass plate or the like is selected. By setting the oscillating frequency of the oscillator 4 to the resonance frequency including the pen tip 5, an efficient oscillation conversion can be performed.

An elastic wave which is propagated to the oscillation propagating plate 8 as mentioned above is a plate wave and has an advantage such that it is difficult to be influenced by a scratch, an obstacle, or the like on the surface of the oscillation propagating plate as compared with a surface acoustic wave or the like.

<Attaching structure of the oscillation sensor>

An attaching form of the oscillation sensor 6 which is attached onto the oscillation propagating plate 8 will now be described in detail with reference to FIGS. 2 to 5.

Figure 2:
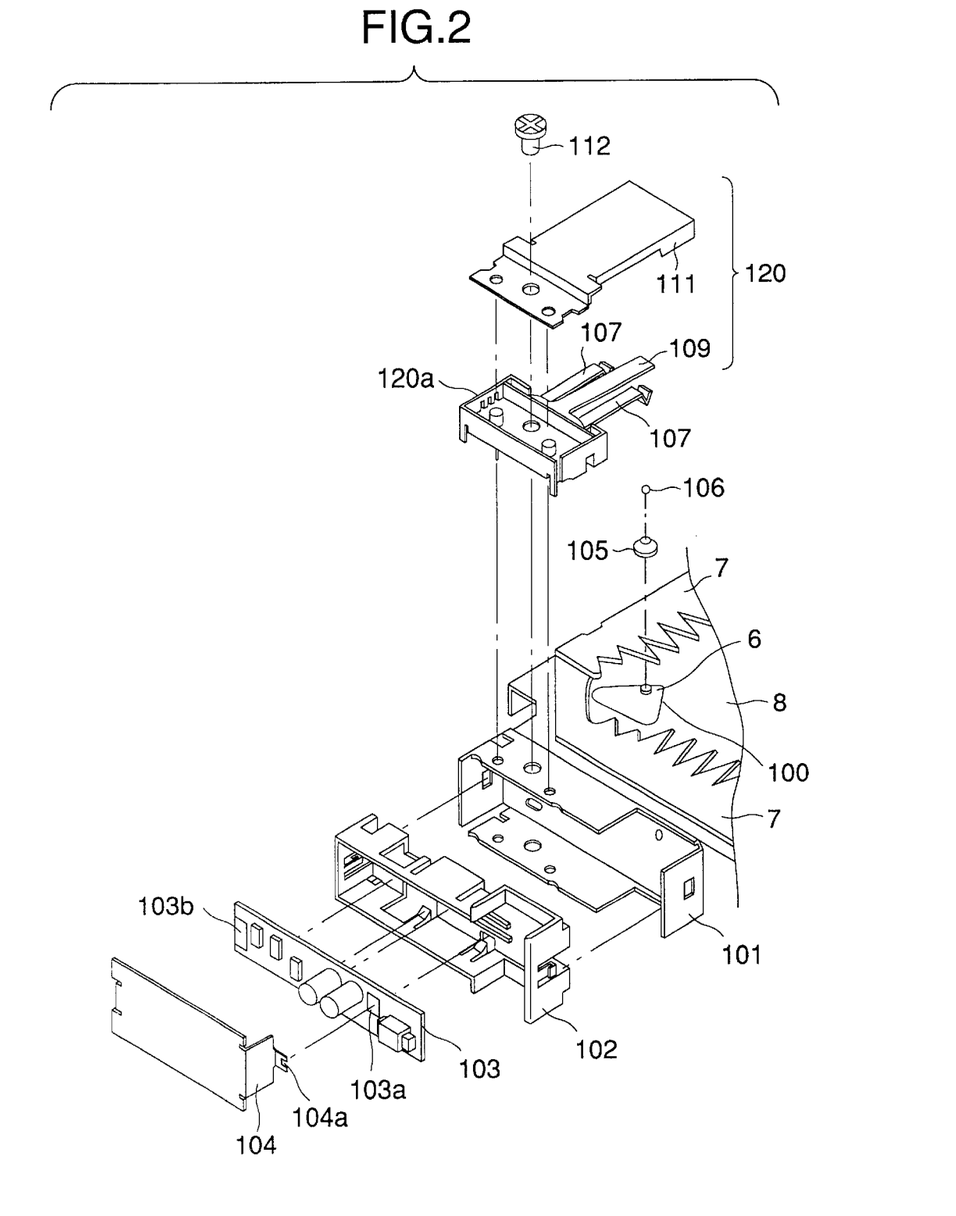
FIG. 2 is a diagram for explaining an attaching structure of an oscillation sensor in the embodiment.

FIG. 2 is a diagram for explaining an attaching structure of the oscillation sensor in the embodiment. In FIG. 2, reference numeral 6 denotes the oscillation sensor to detect the oscillation. The oscillation sensor is fixed to a conductive region 100 provided on the oscillation propagating plate 8 by means such as adhesion or the like in a manner such that one electrode of the sensor 6 is come into contact with the conductive region 100.

In the embodiment, since the display 11 is overlappingly arranged under the oscillation propagating plate 8, glass is used as an oscillation propagating plate 8. Therefore, the conductive region 100 is required. If a conductive propagating material (for example, aluminum) is used as an oscillation propagating plate 8, the conductive region 100 is unnecessary. The coordinates input apparatus of the embodiment operates on the basis of a basic principle such that a propagation time of the oscillation is measured, a distance between the oscillation input position and each sensor is first derived, and the position is obtained by a geometrical method, which will be explained hereinlater. Therefore, when the oscillation sensor 6 is adhered, it has to be positioned at a high precision. In the embodiment, since the adhering means is used to fix the oscillation sensor, the oscillation sensor can be fixed at a high precision by using a high precise tool.

As mentioned above, the oscillation sensor 6 (four sensors in case of the embodiment) is positioned to the oscillation propagating plate at a high precision. The damping member 7 is attached to the outer peripheral portion of the oscillation propagating plate. As mentioned above, a metal frame 101 is attached by means such as a two-sided tape or the like to the oscillation propagating plate 8 to which the oscillation sensor 6 and damping member 7 are attached.

As described in "BACKGROUND OF THE INVENTION" mentioned above, as means for obtaining an electric conduction with the oscillation sensor 6, the soldering as a general technique still has a problem of mass productivity from a viewpoint of managing the characteristics of the sensor. In the embodiment, therefore, the electric conduction with the oscillation sensor 6 is realized by a method, which will be explained hereinlater.

When explaining in accordance with the assembling order, a preamplifier unit 103 for signal amplification is fixed to the metal frame 101 through an amplifier holder (insulating material) 102 by means such as patching or the like.

Figure 3:
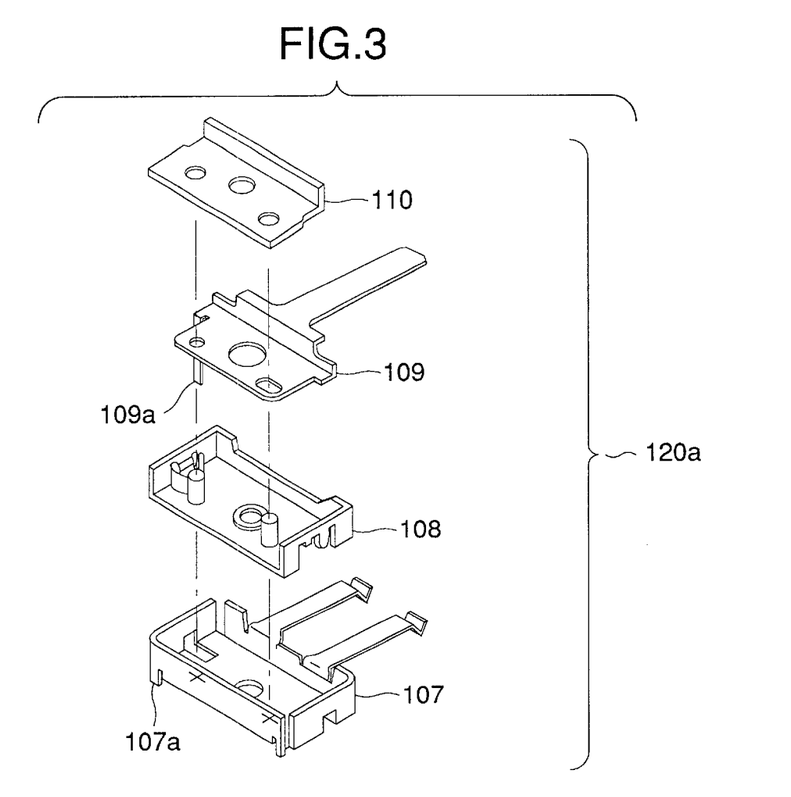
FIG. 3 is a diagram for explaining a construction of an electrode unit.

An electrode unit 120 is subsequently assembled. FIG. 3 is a diagram for explaining a construction of the electrode unit. As shown in FIG. 3, a fixed unit 120a is constructed by fixing a ground electrode 107, a casing (insulating material) 108, a signal electrode 109, and a spacer (insulating material) 110 by means such as patching or the like. The electrode unit 120 is obtained by assembling the unit 120a and a shield casing 111. In the embodiment, although the shield casing 111 and unit 120a are separately constructed, it will be obviously understood that the integrated electrode unit including the shield casing can be also formed.

Figure 5:
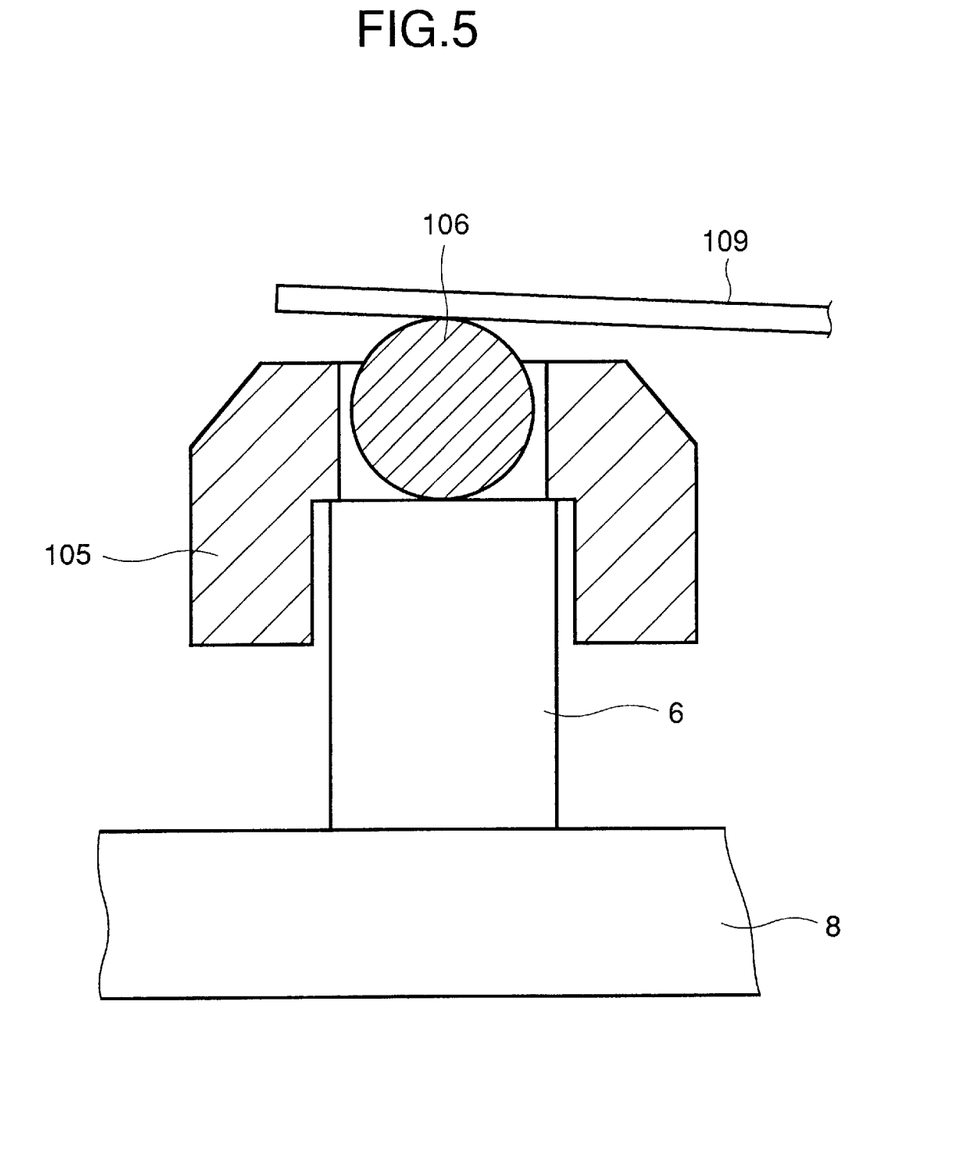
FIG. 5 is a diagram for explaining the details of an attaching state of a contact member according to the embodiment.

Referring again to FIG. 2, an annular positioning member 105 is arranged so that an axis of the oscillation sensor 6 and the center of a conductive contact member 106 (having a ball shape in the embodiment) coincide. FIG. 5 is a diagram for explaining the details of an attaching state of the contact member according to the embodiment. As will be understood from FIG. 5, the annular member 105 is fitted to an outer shape of the oscillation sensor 6 and the contact member 106 having a ball shape is arranged in the center portion of the annular member. In this manner, the contact member 106 is accurately positioned by the annular member 105 by using the outer shape of the oscillation sensor 6 as a reference.

Subsequently, the electrode unit 120 is fixed to the frame 101 in a state where the contact member 106 is sandwiched by using a screw 112. By fixing both of them, a contact portion of the ground electrode 107 is come into contact with the conductive region 100 and is short-circuited to the metal frame 101. A contact portion of the signal electrode 109 is conductive to one electrode of the sensor 6 through the contact member 106 (the contact portions of those members are elastically deformed by the screw clamping, thereby acting a pressure contact force). The shield casing 111 is short-circuited to the metal frame 101 through the screw 112.

Figure 4:
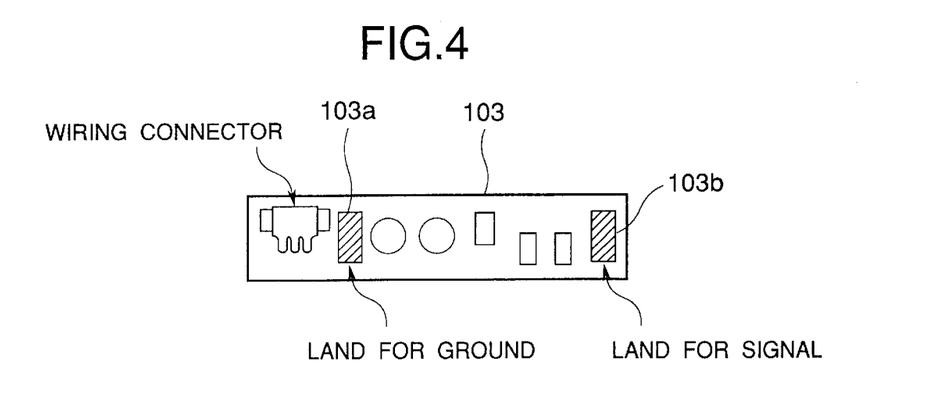
FIG. 4 is a diagram for explaining a preamplifier unit 103.

FIG. 4 is a diagram for explaining the preamplifier unit 103. As shown in FIG. 4, a land 103*a* for ground and a land 103*b* for signal are formed on the board surface of the preamplifier unit 103. When the assembling is completed, a terminal portion 109*a* (refer to FIG. 3) of the signal electrode 109 is arranged at the position of the land 103*b* for signal of the preamplifier 103 and can be conductive to one electrode of the oscillation sensor 6 by using the solder or elastic force. In such a state, a protecting casing (conductive material) 104 is finally arranged. A terminal portion 104*a* of the protecting casing 104, the land 103*a* for ground of the preamplifier 103, and a terminal portion 107*a* (refer to FIG. 3) of the ground electrode 107 are fixed by means such as solder or the like, thereby obtaining a conduction. In this manner, the device wirings and all of the shield countermeasures are completed.

As described above, since one electrode of the sensor 6 is conductive through the contact of the contact member 106 and signal electrode 109, a mechanical degree of freedom exists between the contact member 106 and signal electrode 109. Therefore, in spite of a fact that the positioning precision of the sensor is high, it is sufficient that the positional precision of the foregoing electrode deriving means is relatively rough and the apparatus can be cheaply manufactured.

Further, the generation of a thermal stress in the sensor portion which is caused due to a difference of coefficients of linear expansion of the oscillation propagating plate 8 and frame 101 because of an environmental fluctuation at the time of the actual use can be suppressed by the mechanical degree of freedom, so that the stable oscillation can be detected. That is, although the spring force which is generated by the signal electrode 109 acts on the contact member 106, the contact member 106 is always positioned to the sensor 6 by the annular positioning member 105. Therefore, even if a relative positional deviation between the signal electrode 109 and contact member 106 occurs, the electrical contact position with the oscillation sensor 6 is not changed. The stress state of the sensor 6 can be always held for a fluctuation of an environmental factor or the stable oscillation detection can be performed irrespective of the working precision on manufacturing. The coordinates can be calculated at a high precision.

Further, the land for signal is formed on the board surface of the preamplifier 103 and the conduction is obtained by the terminal portion 109*a* of the signal electrode 109 and the solder or the like in the assembled state. Therefore, it is sufficient to roughly position the preamplifier 103 (it will be obviously understood that if the size of land 103*b* for signal is increased, the positioning precision can be further reduced). With the construction as shown in the embodiment (FIG. 1), the soldering direction is set to one direction and an excellent effect such that the working efficiency can be improved is derived.

As mentioned above, to enable the coordinates to be calculated at a high precision, it is necessary to position the oscillation sensor 6 to the oscillation propagating plate 8 at a high precision and to manufacture. However, the conducting means for obtaining the signal of the oscillation sensor 6 can be manufactured at a relatively rough precision. There is an advantage such that the frame 101 to fix them can be cheaply manufactured.

<Explanation of the arithmetic control circuit>

In the foregoing construction, the arithmetic control circuit 1 generates a signal for allowing the oscillator driving circuit 2 to drive the oscillator 4 in the oscillatory pen 3 every predetermined periods (for example, every 5 msec) and allows an internal timer (constructed by a counter) to start the time counting operation. The oscillation generated by the oscillatory pen 3 is delayed in accordance with the distances to the oscillation sensors 6*a* to 6*d* and arrives.

The signal waveform detection circuit 9 detects the signals from the oscillation sensors 6*a* to 6*d* and forms a signal indicative of an oscillation arrival timing to each oscillation sensor by a waveform detecting process, which will be explained hereinlater. However, the arithmetic control circuit 1 inputs this signal of each sensor, detects the oscillation arrival time to each of the oscillation sensors 6*a* to 6*d*, and calculates the coordinates position of the oscillatory pen.

On the basis of the calculated position information of the oscillatory pen 3, the arithmetic control circuit 1 drives the display driving circuit 10, controls the display by the display 11, or outputs the coordinates to external equipment by a serial or parallel communication (not shown).

Figure 6:
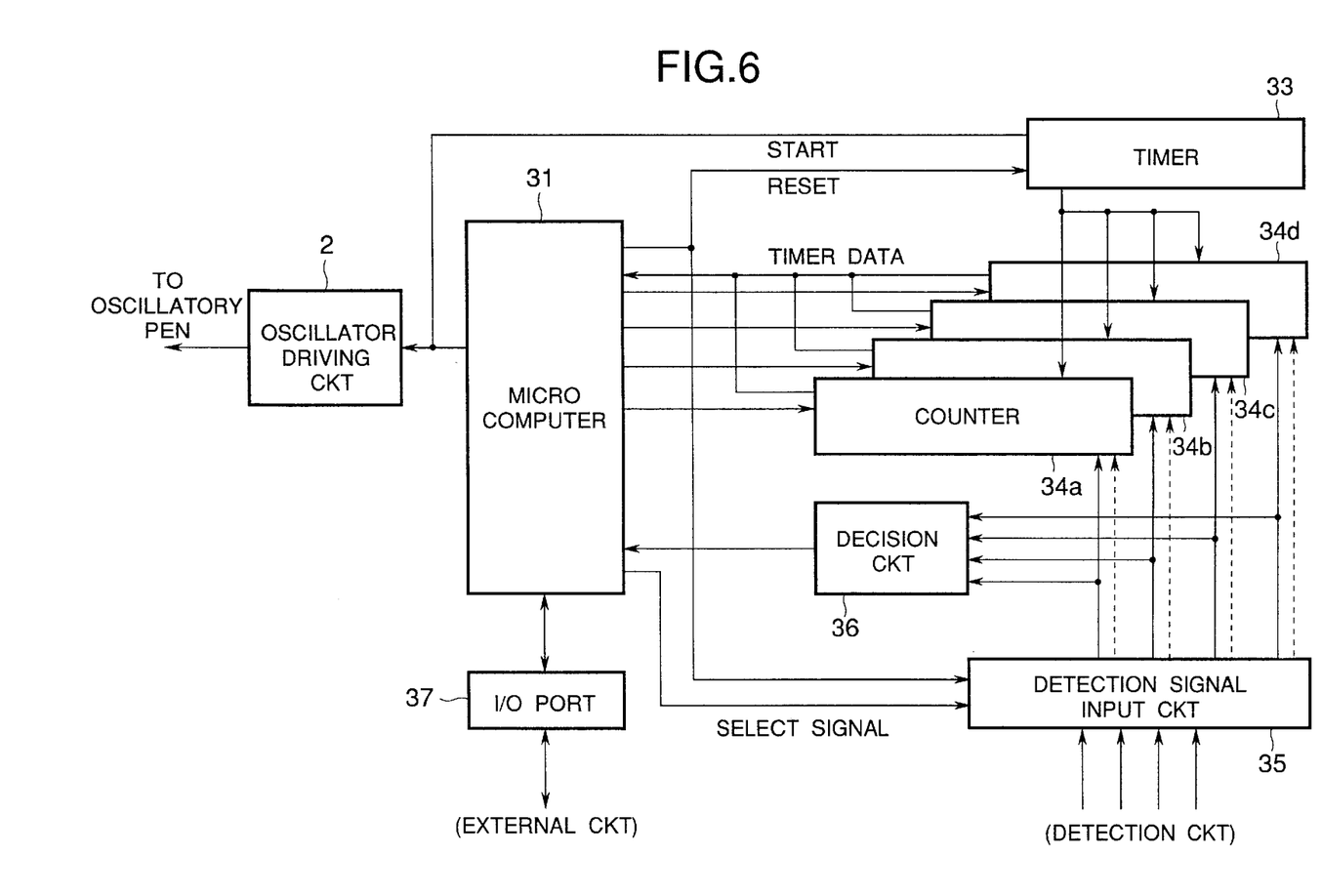
FIG. 6 is a block diagram showing a schematic construction of an arithmetic control circuit 1 of the embodiment.

FIG. 6 is a block diagram showing a schematic construction of the arithmetic control circuit 1 of the embodiment. Each component element and its operation will now be schematically described hereinbelow.

In FIG. 6, reference numeral 31 denotes a microcomputer to control the arithmetic control circuit 1 and the whole coordinates input apparatus. The microcomputer is constructed by an internal counter, an ROM in which an operating procedure has been stored, an RAM which is used for calculation or the like, a non-volatile memory to store constants or the like, and the like. Reference numeral 33 denotes a timer (constructed by, for instance, a counter or the like) to count the number of reference clocks (not shown). When a start signal for allowing the oscillator driving circuit 2 to start the driving of the oscillator 4 in the oscillatory pen 3 is inputted, the timer starts the counting operation in response to the start signal. Thus, the start timing of the counting operation is synchronized with the oscillation detecting timing and the delay times until the oscillation is detected by the oscillation sensors (6*a* to 6*d*) can be measured.

The circuit serving as each of the other component elements will be sequentially described. Oscillation arrival timing signals from the oscillation sensors 6*a* to 6*d* which are generated from the signal waveform detection circuit 9 are inputted to latch circuits 34*a* to 34*d* through a detection signal input circuit 35. The latch circuits 34*a* to 34*d* correspond to the oscillation sensors 6*a* to 6*d*, respectively. When the timing signal from the corresponding oscillation sensor is received, a count value of the timer 33 at that time point is latched. When a decision circuit 36 determines that all of the detection signals have been received, it outputs a signal indicative of the reception to the microcomputer 31.

When the signal from the decision circuit 36 is received, the microcomputer 31 reads the oscillation arrival times to the oscillation sensors from the latch circuits 34*a* to 34*d*, executes predetermined calculations, and calculates the coordinates position of the oscillatory pen 3 on the oscillation propagating plate 8. The calculated coordinates position information is outputted to the display driving circuit 10 through an I/O port 37, so that, for example, a dot or the like can be displayed at the corresponding position on the display 11. Or, by outputting the coordinates position information to the interface circuit through the I/O port 37, the coordinates value can be outputted to the external equipment.

<Explanation of detection of the oscillation propagation time>

Figure 7:
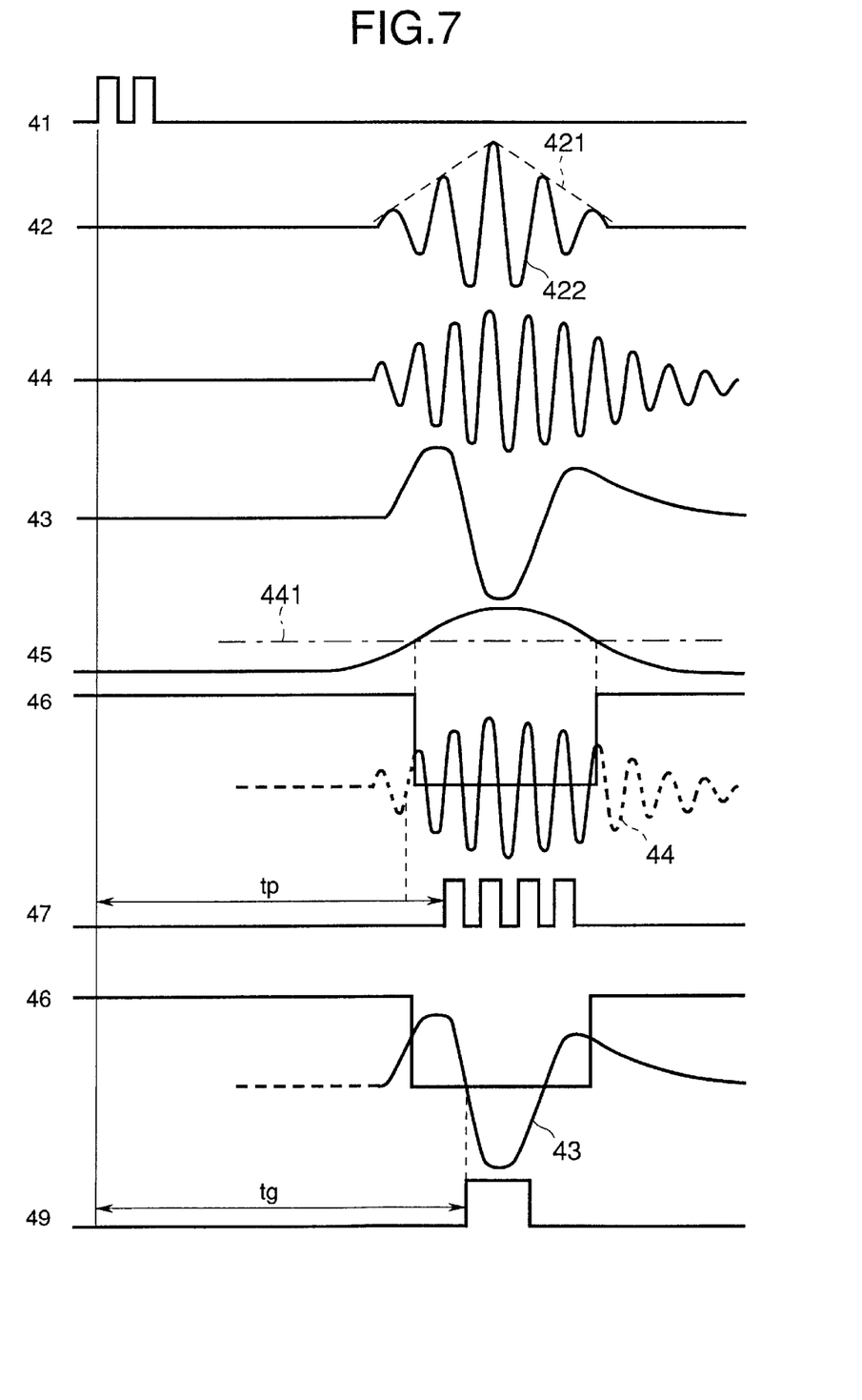
FIG. 7 is a diagram for explaining detection waveforms which are inputted to a signal waveform detection circuit 9 and a measuring process of oscillation propagation times based on them.

FIG. 7 is a diagram for explaining detection waveforms which are inputted to the signal waveform detection circuit 9 and the measuring process of the oscillation propagation times based on them. Although a case of the oscillation sensor 6a will now be described hereinbelow, the same shall also similarly apply to the other oscillation sensors 6b, 6c, and 6d.

As already described above, the measurement of the oscillation propagation time to the oscillation sensor 6a is started simultaneously with the output of the start signal to the oscillator driving circuit 2. In this instance, a drive signal 41 is supplied from the oscillator driving circuit 2 to the oscillator 4. By the signal 41, the ultrasonic wave oscillation propagated from the oscillatory pen 3 to the oscillation propagating plate 8 progresses with the time corresponding to the distance to the oscillation sensor 6a and, after that, it is detected by the oscillation sensor 6a. A signal indicated by 42 in the diagram shows a signal waveform detected by the oscillation sensor 6a.

Since the oscillation used in the embodiment is the plate wave as mentioned above, a propagating velocity (group velocity Vg) of an envelope 421 of the detection waveform and a propagating velocity (phase velocity Vp) of a phase 422 differ. Therefore, for the propagation distance in the oscillation propagating plate 8, the relation between the envelope 421 and phase 422 of the detection waveform changes in accordance with the propagation distance during the oscillation propagation. In the embodiment, the distance between the oscillatory pen 3 and oscillation sensor 6a is detected from a group delay time tg based on the group velocity Vg and a phase delay time tp based on the phase velocity Vp.

Figure 8:
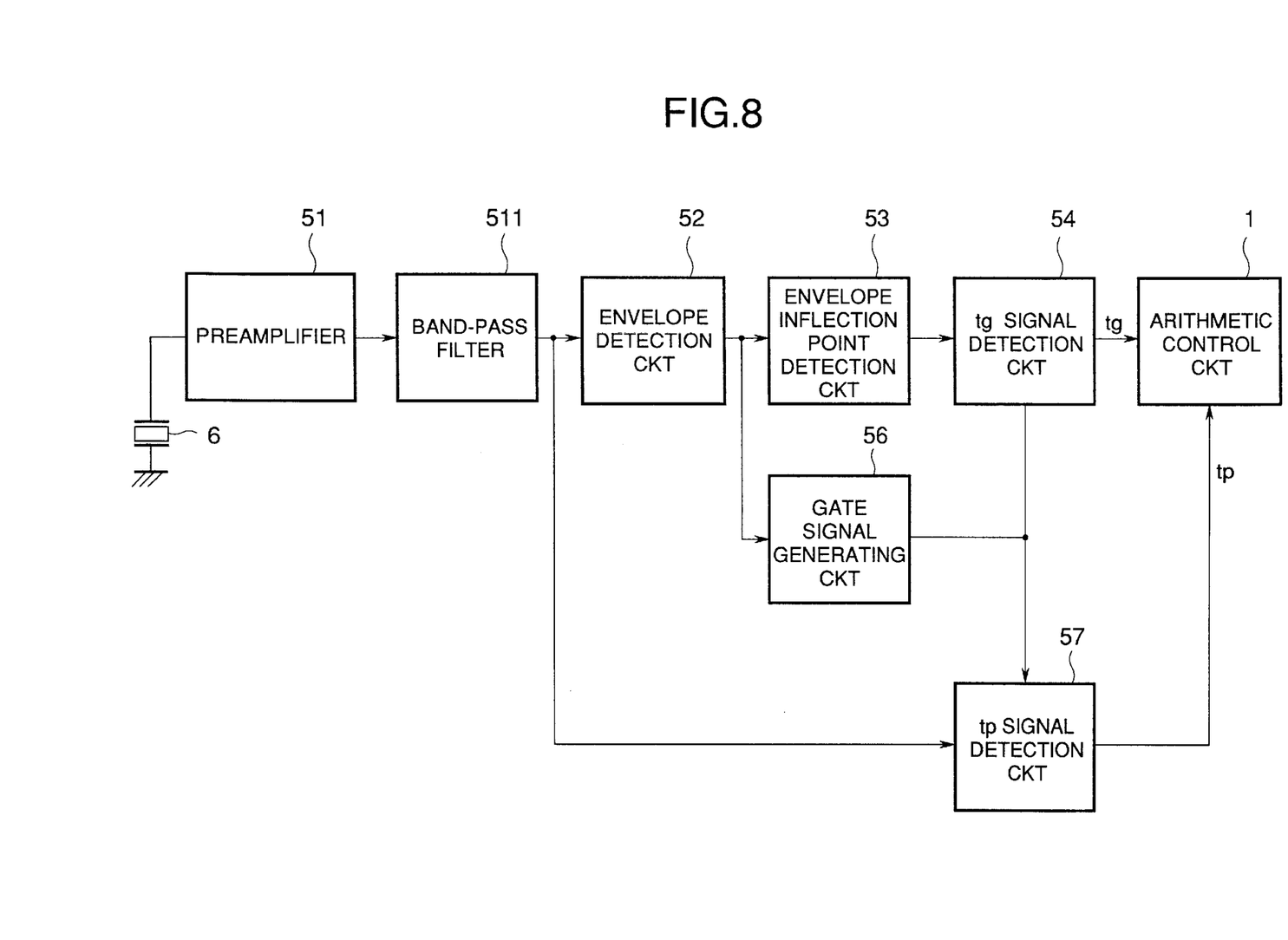
FIG. 8 is a block diagram showing a construction of the signal waveform detection circuit 9.

FIG. 8 is a block diagram showing a construction of the signal waveform detection circuit 9. Means for detecting the group delay time tg and phase delay time tp will now be described hereinbelow with reference to FIGS. 7 and 8.

The output signal 42 of the oscillation sensor 6a is amplified to a predetermined level by a preamplifier 51. After that, surplus frequency components of the detection signal are eliminated by a band-pass filter 511, so that a signal 44 is derived. When paying an attention to the envelope of the signal, the propagating acoustic wave velocity of the waveform is equal to the group velocity Vg. When a certain specific point on the waveform, for example, a peak of the envelope or an inflection point of the envelope is detected, the group delay time tg regarding the group velocity Vg is obtained. Therefore, the signal 44 which was amplified by the preamplifier 51 and passed through the band-pass filter 511 is inputted to an envelope detection circuit 52 constructed by, for example, an absolute value circuit, a low band-pass filter, and the like. Only an envelope 45 of the detection signal is extracted.

Further, the envelope 45 which is outputted from the envelope detection circuit 52 is inputted to a gate signal generating circuit 56. The gate signal generating circuit 56 is constructed by a multivibrator or the like and forms a gate signal 46 showing a portion where the envelope 45 exceeds a preset threshold level 441 and generates the gate signal 46.

To detect the group delay time tg regarding the group velocity Vg, as mentioned above, it is sufficient to detect the peak, inflection point, or the like of the envelope. In case of the embodiment, however, the first inflection point (trailing zero-cross point of a signal 43, which will be explained hereinlater) of the envelope is detected. Therefore, the envelope 45 outputted by the envelope detection circuit 52 is inputted to an envelope inflection point detection circuit 53, thereby obtaining the second order differential waveform 43 of the envelope. The differential waveform signal 43 is compared with the gate signal 46. On the basis of a comparison result, a pulse signal which rises at a timing of the trailing zero-cross point of the signal 43 is formed by a tg signal detection circuit 54 comprising a multivibrator or the like. Thus, a tg signal 49 as an envelope delay time detection signal of a predetermined waveform is formed and inputted to the arithmetic control circuit 1.

The phase delay time tp regarding the phase velocity Vp will now be described. Reference numeral 57 denotes a tp sinal detection circuit comprising a zero-cross comparator, multivibrator, or the like for detecting the phase delay time tp. The tp signal detection circuit 57 detects the first leading zero-cross point of the phase signal 44 for a period of time when the gate signal 46 is open. A signal 47 indicative of the phase delay time tp is supplied to the arithmetic control circuit 1.

The above description relates to the case of using one sensor. However, it will be obviously understood that the same circuit is provided for each of the other oscillation sensors or the sensor is time-divisionally selected by using an analog switch or the like, thereby sharing the circuit.

<Description of calculation of distance between the oscillatory pen and the sensor>

Figure 9:
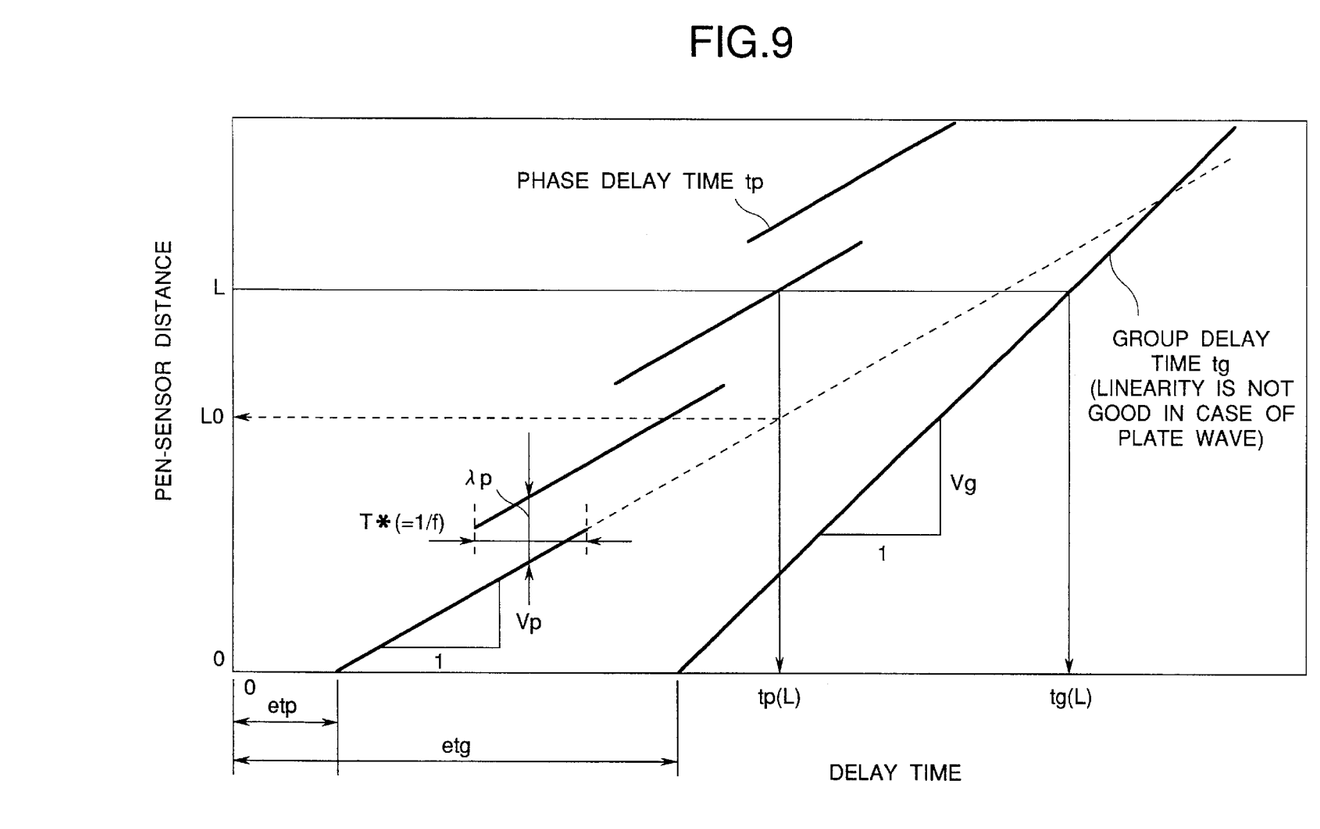
FIG. 9 is a diagram schematically showing relations among a group delay time tg, a phase delay time tp, and a pen-sensor distance L which are obtained by the embodiment.

A method of respectively calculating the distance between the oscillatory pen and each sensor from the group delay time tg and phase delay time tp obtained as mentioned above will now be described. FIG. 9 is a diagram schematically showing the relations among the group delay time tg, phase delay time tp, and pen-sensor distance L which are obtained by the embodiment. In the embodiment, since the plate wave is used as a detection wave, the linearity of the group delay time tg is not so good. Therefore, in the case where the distance L between the oscillatory pen 3 and oscillation sensor 6a is obtained as a product of the group delay time tg and group velocity Vg as shown in the following equation (1), the distance L cannot be accurately obtained.

$$L = Vg \cdot tg \quad (1)$$

Therefore, to decide the coordinates at a higher precision, an arithmetic operating process is executed by the following equation (2) on the basis of the phase delay time tp having excellent linearity.

$$L = Vp \cdot tp + n \cdot \lambda p \quad (2)$$

where, λp: wavelength of elastic wave n: integer

That is, the first term of the right side of the equation (2) shows a distance L0 in FIG. 9. As will be obviously understood from the diagram, a difference to be obtained between the distances L and L0 is integer times as long as the wavelength (a width T* of a stairway on the time base is equal to one period of the signal waveform 44, so that T*=1/frequency; the width of stairway is equal to the wavelength λp if it is shown by a distance). Therefore, by obtaining the integer n, the pen-sensor distance L can be accurately obtained at a high precision. The integer n can be obtained by the following equation (3) from the equations (1) and (2).

$$n = \text{int}[(Vg \cdot tg - Vp \cdot tp)/\lambda p + \tfrac{1}{2}] \quad (3)$$

As mentioned above, since the plate wave is used as a detection wave, the linearity of the group delay time tg for the distance is not so good. This is why the process to obtain an integer in the equation (3) is executed. The necessary and enough conditions to obtain an accurate integer N as shown in the equation (5) which is derived from the equation (4).

$$n^* = (V_g \cdot t_g - V_p \cdot t_p)/\lambda_p \quad (4)$$

$$\Delta N = n^* - n \leq 0.5 \quad (5)$$

That is, this means that if an amount of errors generated lies within ±½ wavelength, even if the linearity of the group delay time tg is not so good, the integer n can be accurately determined. By substituting n obtained as mentioned above into the equation (2), the distance L between the oscillatory pen 3 and oscillation sensor 6a can be accurately measured.

Although the above equations relate to one oscillation sensor 6a, the distance between each of the other three oscillation sensors 6b to 6d and the oscillatory pen 3 can be also similarly obtained by the same equation.

<Description of correction of the circuit delay time>

The oscillation propagation times latched by the latch circuits 34a to 34d include the delay times which are caused on the circuit, namely, a phase circuit delay time etp and a group circuit delay time etg (refer to FIG. 9; they also include the time which is required when the oscillation propagates in the pen tip 5 of the oscillatory pen 3 or the like besides the circuit delay times). As for the errors which are generated by them, the same amount of errors are certainly included at the time of the oscillation propagation which is executed from the oscillatory pen 3 to the oscillation propagating plate 8 and to the oscillation sensors 6a to 6d.

Figure 10:
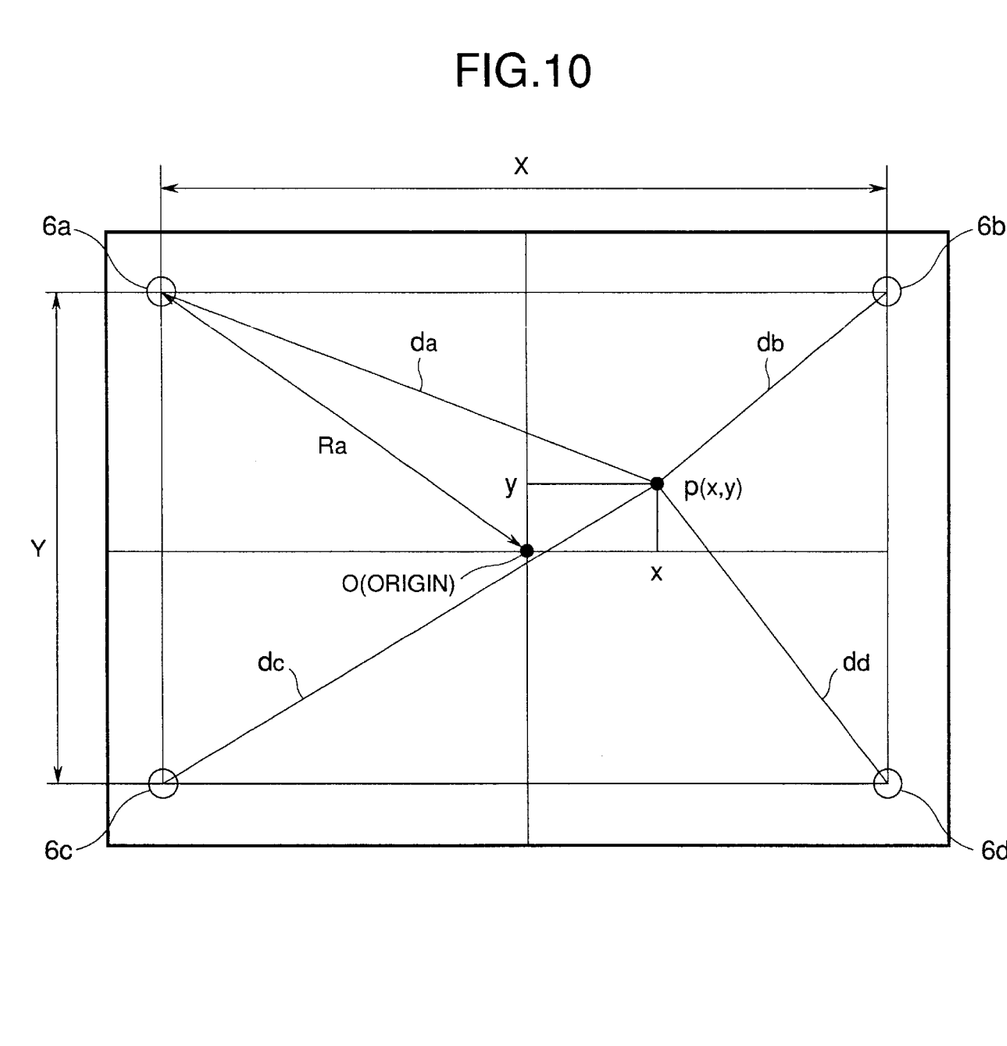
FIG. 10 is a diagram for explaining a coordinates position detection according to the embodiment.

Therefore, for example, a distance from the position of an origin O in FIG. 10 to, for instance, the oscillation sensor 6a is shown by Ra (=sqr{$(X/2)^2+(Y/2)^2$}), where, X^Y denotes the Y power of X; refer to FIG. 10). Oscillation propagation times which are actually measured for the interval from the origin O to the sensor 6a by inputting the oscillation by the oscillatory pen 3 at the origin O are labelled to tg0* and tp0*, respectively. Propagation times which are required when the wave actually propagates on the propagating material in a range from the origin O to the sensor are indicated by tg0 and tp0, respectively. In this instance, there are the following relations.

$$tg0^* = tg0 + etg \quad (6)$$

$$tp0^* = tp0 + etp \quad (7)$$

Actual measurement values tg* and tp* at an arbitrary input point P are similarly obtained as follows.

$$tg^* = tg + etg \quad (8)$$

$$tp^* = tp + etp \quad (9)$$

Differences between the equations (6) and (8) and between the equations (7) and (9) are as follows.

$$tg^* - tg0^* = (tg+etg) - (tg0+etg) = tg - tg0 \quad (10)$$

$$tp^* - tp0^* = (tp+etp) - (tp0+etp) = tp - tp0 \quad (11)$$

As will be obviously understood from the equations (10) and (11), the phase circuit delay time etp and group circuit delay time etg included in the propagation times are removed. An accurate time difference between the time which is required when the wave propagates by the distance Ra and the time which is required when the wave propagates by a distance da can be obtained. Therefore, by using the equations (1), (2), and (3), the distance difference between the distances Ra and da can be obtained. That is, by setting $$tg = tg^* - tg0^* \quad (12)$$

$$tp = tp^* - tp0^* \quad (13)$$

the distances are calculated by using the equations (1), (2), and (3). By adding the distance Ra from the oscillation sensor 6a to the origin O to the values of the distances, the distance between the oscillatory input pen 3 and oscillation sensor 6a can be accurately obtained.

Therefore, by preliminarily storing the distance Ra from the oscillation sensor 6a to the origin O and the times tg0* and tp0* measured at that time point into a non-volatile memory or the like, the distance between the oscillatory pen 3 and oscillation sensor 6a can be determined. The distance can be also similarly obtained with respect to each of the other sensors 6b to 6d.

<Description of calculation of the coordinates position>

A principle of actually detecting the coordinates position on the oscillation propagating plate 8 by the oscillatory pen 3 will now be described. FIG. 10 is a diagram for explaining the detection of the coordinates position according to the embodiment.

As shown in FIG. 10, when four oscillation sensors 6a to 6d are provided at positions shown in the diagram at four corners on the oscillation propagating plate 8, on the basis of the principle described above, straight line distances da to dd from the position P of the oscillatory pen 3 to the positions of the oscillation sensors 6a to 6d can be obtained. Further, on the basis of the straight line distances da to dd by the arithmetic control circuit 1, the coordinates (x, y) of the position P of the oscillatory pen 3 can be obtained by the theorem of three squares by the following equations.

$$x = (da+db) \cdot (da-db)/2X \quad (14)$$

$$y = (da+dc) \cdot (da-dc)/2Y \quad (15)$$

where, X: distance between the oscillation sensors 6a and 6b

Y: distance between the oscillation sensors 6a and 6d

The position coordinates of the oscillatory pen 3 can be detected in a real-time manner as mentioned above.

Although the position coordinates are calculated by using the distance information to the three sensors according to the above equations, in the embodiment, four sensors are attached and the distance information of one remaining sensor is used to verify the reliability of the output coordinates. It is also passible to calculate the coordinates by a method whereby the distance information (since the distance L increases, the detection signal level decreases, and a probability such that it is influenced by noises is large) of the sensor in which the pen-sensor distance L is the largest is not used but the coordinates are calculated by using the three remaining sensors. In the embodiment, four sensors are arranged and the coordinates are calculated by the three sensors. However, the coordinates can be geometrically calculated by using two or more sensors. The number of sensors is obviously set in accordance with the product specifications.

As described above, the coordinates detecting apparatus of the embodiment is based on the basic principle such that by measuring the oscillation arrival times, the distances between the oscillation input source and the sensors are calculated and the coordinates are calculated by the geometrical calculating processes. Therefore, to calculate the coordinates at a high precision, the sensors have to be positioned at a high precision and manufactured.

In response to such a requirement, according to the embodiment, the conduction with each sensor is performed by the signal electrode of the plate spring through the contact member. Therefore, the stress state of each sensor is stabilized and the coordinates can be calculated at a high precision with a small detection error. Further, since the apparatus has a mechanical degree of freedom, the signal electrode can be positioned at a relatively rough precision and there is an advantage such that it has an excellent mass productivity (the other electrode deriving means of the sensors can be also roughly positioned as will be obviously understood from the above description).

Further, the foregoing plate spring is connected to the land provided on the board of the preamplifier and is connected by means such as solder or the like in a state where all of the component elements are fully assembled. Therefore, it is sufficient to set the positioning precision of the preamplifier to a rough precision. That is, the working precision of the frame to fix the preamplifier and electrode unit 120 can be realized by the ordinary mass producing technique. Excellent advantages such that not only they can be cheaply manufactured but also the assembling steps are easy can be obtained.

According to the embodiment, since the sensor unit is constructed by: the electrodes (signal electrode 109, ground electrode 107) to obtain the electrical conduction with the oscillation sensors; the electrode unit 120 integratedly constructing the shield casing 111; and the preamplifier unit 103 in which the patterns (lands) to input the output signals of the oscillation sensors are formed on the parts installing surface of the signal processing circuit to process the signals detected by the oscillation sensors. Therefore, the sensor unit can be easily electrically wired.

The invention can be applied to a system comprising a plurality of equipment (for example, a host computer, interface equipment, reader, printer, and the like) or can be also applied to an apparatus (for instance, a copying apparatus, a facsimile apparatus, or the like) comprising one equipment.

As described above, according to the invention, the mechanical degree of freedom is provided between the electrodes which are electrically connected to the sensors and the sensors, thereby enabling both of the assurance of the arranging position precision of the sensors and the easiness of manufacturing to be accomplished.

According to the invention, the electrodes which are electrically connected to the sensors and the shield member are integratedly constructed and the electric wirings to the sensors can be easily performed.

What is claimed is:

1. A coordinates input apparatus for calculating an oscillation inputted coordinates position on an oscillation propagating plate on the basis of a delay time which is required until an elastic wave oscillation inputted onto said oscillation propagating plate arrives at oscillation detecting means and for outputting the calculated coordinates position, comprising:

a detecting device which is fixed in a manner such that one electrode surface is come into contact with a conductive surface of said oscillation propagating plate and detects the oscillation which is propagated in said oscillation propagating plate;

a contact member which is arranged on the other electrode surface of a sensor;

positioning means for positioning said contact member by using an external shape of said sensor as a reference;

a first electrode member which is come into contact with said conductive surface so as to be electrically conductive; and a second electrode member which is come into contact with said contact member so as to be electrically conductive with the electrode surface of said sensor through said contact member.

2. An apparatus according to claim 1, wherein said oscillation propagating plate is made of a conductive material.

3. An apparatus according to claim 1, wherein conductive films are formed at a plurality of positions on said oscillation propagating plate and said detecting device is fixed in a manner such that the portion formed with said conductive film is used as said conductive surface.

4. An apparatus according to claim 1, wherein said first and second electrode members are made of an elastic material and are come into pressure contact with said conductive surface and said contact member by an elastic force, respectively.

5. An apparatus according to claim 1, further comprising signal processing means for processing a signal which is derived from said detecting device, and wherein said first and second electrode members are electrically connected to said signal processing means.

6. An apparatus according to claim 5, wherein said first and second electrode members are electrically connected to a pattern provided on a signal processing means board provided for said signal processing means.

7. An apparatus according to claim 1, wherein said first and second electrode members are integrated while keeping an electrical insulating state.

8. An apparatus according to claim 1, further comprising an insulating member made of an insulating material, and wherein said first and second electrode members are integrated so as to sandwich said insulating member.

9. An apparatus according to claim 1, further comprising a shield member made of a conductive material, and wherein said first and second electrode members and said shield member are integrated while keeping an electrical insulating state between said first and second electrode members and keeping an electrical insulating state between said shield member and said second electrode member.

10. A sensor attaching method of attaching a sensor having at least two surfaces as electrode surfaces, comprising the steps of:

fixing said sensor to a desired position on a conductive surface in a manner such that said conductive surface and one of the electrode surfaces of said sensor are electrically connected;

positioning a contact member onto the other electrode surface by using an external shape of said sensor as a reference;

making a first electrode member come into contact with said conductive surface so as to be electrically conductive; and making a second electrode member come into contact with said contact member so as to be electrically conductive with the electrode surface of said sensor through said contact member.

11. A method according to claim 10, wherein said first and second electrode members are made of an elastic material and are come into pressure contact with said conductive surface and said contact member by an elastic force.

12. A method according to claim 10, further comprising the step of electrically connecting said first and second electrode members to a signal processing circuit.

13. A method according to claim 12, wherein said first and second electrode members are electrically connected to a pattern provided for said signal processing circuit.

14. A method according to claim 10, wherein said first and second electrode members are integrated and supplied while keeping an electrical insulating state.

15. A method according to claim 10, wherein said first and second electrode members which are mutually electrically insulated and a shield member which is electrically insulated from said second electrode member are integrated and supplied.

16. An attaching structure of a sensor having at least two surfaces as electrode surfaces, comprising:

a plate member which has a conductive surface and in which said sensor is fixed to a desired position on said conductive surface in a manner such that said conductive surface and one of said electrode surfaces of said sensor are electrically connected;

a contact member arranged on the other electrode surface of said sensor;

positioning means for positioning said contact member by using an external shape of said sensor as a reference;

a first electrode member which is come into contact with said conductive surface so as to be electrically conductive; and a second electrode member which is come into contact with said contact member so as to be electrically conductive with the electrode surface of said sensor through said contact member.

* * * * *

UNITED STATES PATENT AND TRADEMARK OFFICE
CERTIFICATE OF CORRECTION

PATENT NO.    : 6,415,240 B1
DATED         : July 2, 2002
INVENTOR(S)   : Katsuyuki Kobayashi et al.

It is certified that error appears in the above-identified patent and that said Letters Patent is hereby corrected as shown below:

Column 2,
Lines 12 and 47, "case" should read -- the case --.
Line 46, "JP-A-6133525," should read -- JP-A-61-33525, --.
Line 60, "in that" should read -- in a condition in which --.
Line 61, "a trouble of" should be deleted.

Column 3,
Line 36, "case" should read -- the case --.
Line 54, "both of" should read -- both --.
Line 56, "easiness" should read -- ease --.
Line 57, "forming" should read -- form --.

Column 5,
Line 30, "case" should read -- a case --.

Column 6,
Line 14, "precise" should read -- precision --.

Column 7,
Line 2, "acting" should read -- acting as --.

Column 8,
Line 5, "periods" should read -- period --.

Column 10,
Line 13, "sinal" should read -- signal --.

Column 11,
Line 2, "and" should be deleted.
Line 3, "enough" should be deleted; and "N as" should read -- N are --.

UNITED STATES PATENT AND TRADEMARK OFFICE
CERTIFICATE OF CORRECTION

PATENT NO.   : 6,415,240 B1
DATED        : July 2, 2002
INVENTOR(S)  : Katsuyuki Kobayashi et al.

It is certified that error appears in the above-identified patent and that said Letters Patent is hereby corrected as shown below:

<u>Column 13,</u>
Line 20, "they can" should read -- can they --.
Line 40, "both of" should read -- both --.
Line 42, "easiness" should read -- ease --.

Signed and Sealed this

Seventeenth Day of June, 2003

JAMES E. ROGAN
*Director of the United States Patent and Trademark Office*